United States Patent [19]

Fadner

[11] 4,278,467

[45] Jul. 14, 1981

[54] SUBSTITUTIVE ADDITIVES FOR ISOPROPYL ALCOHOL IN FOUNTAIN SOLUTION FOR LITHOGRAPHIC OFFSET PRINTING

[75] Inventor: Thomas A. Fadner, Pittsburgh, Pa.

[73] Assignee: Graphic Arts Technical Foundation, Pittsburgh, Pa.

[21] Appl. No.: 87,692

[22] Filed: Oct. 22, 1979

Related U.S. Application Data

[63] Continuation of Ser. No. 941,059, Sep. 11, 1978, abandoned.

[51] Int. Cl.³ .......... C09K 3/18; C09K 13/06

[52] U.S. Cl. .......... 106/2; 101/148

[58] Field of Search .......... 106/2; 101/148

[56] References Cited

U.S. PATENT DOCUMENTS

| | | | |
|---|---|---|---|
| 2,142,667 | 1/1939 | Bucy | 106/2 |
| 2,534,650 | 12/1950 | Worthen | 101/149.2 |
| 3,168,037 | 2/1965 | Dahlgren | 101/148 |
| 3,354,824 | 11/1967 | Griffith et al. | 106/2 |
| 3,398,002 | 8/1968 | Bondorant et al. | 106/2 |
| 3,625,715 | 12/1971 | Nasca | 106/2 |
| 3,687,694 | 8/1972 | Van Doren, Jr. | 106/2 |
| 3,745,028 | 7/1973 | Rauner | 106/2 |
| 3,877,372 | 4/1975 | Leeds | 106/2 |
| 4,030,417 | 6/1977 | Lipovac | 106/2 |

*Primary Examiner*—Allan Lieberman

*Attorney, Agent, or Firm*—Stanley J. Price, Jr.; John M. Adams

[57] ABSTRACT

A fountain solution for use with a lithographic offset printing press is prepared by admixing fountain etch constituents, water and between about 0.5 and 5 percent by volume of a substitutive additive for isopropyl alcohol. The additive or replacement may be a Carbitol or Cellosolve derivative or mixtures of Cellosolve or Carbitol derivatives, such as phenyl glycol ethers or other organic non-ionic compounds, as for example, n-hexoxyglycol (n-hexyl Cellosolve), n-hexoxydiethylene glycol, (n-hexyl Carbitol), 2-ethyl-1,3-hexanediol, n-butoxyethylene glycolacetate, n-butoxy-diethyleneglycolacetate, and 3-butoxy-2 propanol. The fountain solution free is isopropyl alcohol does not have the adverse toxic and flammable properties of prior art fountain solutions containing isopropyl alcohol.

2 Claims, No Drawings

SUBSTITUTIVE ADDITIVES FOR ISOPROPYL ALCOHOL IN FOUNTAIN SOLUTION FOR LITHOGRAPHIC OFFSET PRINTING

CROSS REFERENCE TO RELATED APPLICATIONS

This application is a continuation of copending application Ser. No. 941,059 filed on Sept. 11, 1978 now abandoned, entitled "Substitutive Additives For Isopropyl Alcohol In Fountain Solutions For Lithographic Offset Printing" by Thomas A. Fadner.

BACKGROUND OF THE INVENTION

1. Field of the Invention

This invention relates to a fountain solution for lithographic offset printing presses and more particularly to a fountain solution that is free of highly volatile constituents such as isopropyl alcohol.

2. Description of the Prior Art

In the practice of lithographic printing, an aqueous fountain solution is used to maintain the non-image areas of the printing plate insensitive to ink. The typical fountain solution is made up from a fountain etch concentrate, water and from 10 to 30 percent by volume of isopropyl alcohol. The fountain etch concentrate includes an acidic component such as phosphoric acid or citric acid, buffering salts, water-soluble resins or gums such as gum arabic or cellulose gum and frequently a wetting agent. The fountain solution is generally acidic with a pH value between about 4.5 and 5.5. Printing problems sometimes occur when the fountain solution deviates significantly above or below this pH range.

Many lithographic presses have a fountain solution distribution system that is separate from the ink distribution system. Generally, the fountain solution distribution system includes a ductor roller which has intermittent or interrupted flow of the fountain solution from the reservoir to dampening form rollers that contact the printing plate. Often these conventional dampening systems use paper or molleton (cloth) covered rollers or specially treated rollers in the dampening system roller train to act as intermediate fountain solution reservoirs. Alternately brushes can flick droplets of water onto form rollers or directly onto the plate or nozzles can similarly spray a fine mist.

Historically, these systems did not require the use of isopropyl alcohol in the fountain solution to obtain competitively acceptable printing quality. A significant number of the printers presently add up to about 10 to 15 percent by volume of isopropyl alcohol to the fountain solutions to obtain better control of the ink and water feed.

Some lithographic presses are equipped with a continuous feed dampening system sold by Dahlgren Mfg. Co., Dallas, Tex., under the tradename Dahlgren. Other dampening systems of the direct continuous type include the system sold by Miehle-Goss-Dexter, Chicago, Ill., under the trademark Miehlematic, and by Harris Corp., Cleveland, Ohio, under the trademark Microflow and by Miller Western Mfg. Co., Pittsburg, Pa., under the trademark Millermatic.

In the Dahlgren system, the printing plate is contacted only by inked rollers, that is, the fountain solution must be carried from the dampening unit rollers by means of one or more inked rollers, usually one of the form rollers, to the printing plate. This type of system requires the assistance of a water transport additive such as a water soluble glycol as disclosed in U.S. Pat. No. 3,625,715 or an alcohol such as disclosed in U.S. Pat. No. 3,168,037, with isopropyl alcohol being almost universally used. The excellent and more independent control of ink and water delivery to the printing plate accounts for the ever increasing use of the Dahlgren system in lithographic printing. This, in turn, accounts for the extensive use of isopropyl alcohol in Dahlgren continuous dampening systems. Typically, the fountain solution will contain between about 15 to 30 percent isopropyl alcohol depending upon the specific press, speed, type of form and substrate being printed. The use of isopropyl alcohol is the best compromise between good press and printing performance and cost of the fountain solution.

Another variety of a continuous contact dampening system is the Millermatic type wherein the fountain solution is applied to the printing plate by means of a dampener form roller that is not part of the inking system. With such an arrangement it would be expected that isopropyl alcohol would not be required because the inked form roller is not used to distribute the aqueous fountain solution. Because, however, of the excellent ink and water balance control, it is also common to use isopropyl alcohol as a constituent in the dampening solution used with the Millermatic type of dampener.

The basis for isopropyl alcohols' utility in continuous lithographic systems resides partly in its stability to transport the fountain solution to the printing plate by means of the inked rollers. This property has been attributed to the low surface tension of the aqueous solutions at volume concentrations above about 10 percent isopropyl alcohol. This allows the fountain solution to wet and mix with the ink which normally can be done only with considerable difficulty. The enhanced wetting effect allows the water-containing fountain solution to be carried on or within the film of ink on the form roller and then to the printing plate where it perferentially deposits in the hydrophilic non-image areas.

The exact mechanism by which isopropyl alcohol achieves this advantageous effect is not completely understood within the industry. For this reason empirical data is not available to predict with any degree of certainity constituents which would serve as a replacement for isopropyl alcohol.

Because of the toxic and flammable properties of isopropyl alcohol and because it is relatively expensive, there have been suggestions of materials which would be utilized to replace the isopropyl alcohol in fountain solutions. In U.S. Pat. No. 4,030,417 a fountain solution formulation is disclosed in which two etch concentrates are prepared. The first has as its primary ingredients a fatty acid material, a monovalent hydroxide and water and the second has as its primary ingredients gum arabic, a monovalent iodide and water. The solutions are mixed to form an etch concentrate which is thereafter mixed with water to produce the final fountain solution formulation. The fatty acid material is disclosed as a higher fatty acid having at least six carbon atoms in a linear chain and suggests such fatty acids as stearic acid, oleic acid, linoleic acid and conjugated linoleic acid. It is further stated that modified esters of glycerol and fatty acids such as triglycerides modified with fumaric acid or acrylic acid can also be used.

In U.S. Pat. No. 3,625,715 a fountain solution is disclosed that includes a polyethylene oxide with isopropyl alcohol, diethylene glycol, glycerine, a silicone-glycol copolymer surfactant and an antifoaming agent. It is stated that this solution may be substituted for conventional alcohol solutions without changes in operating procedures. The etch solution in U.S. Pat. No. 3,625,715 that is added to the water contains between 6 percent to 24 percent by weight isopropyl alcohol and between 3 to 9 percent by weight polyethylene oxide.

U.S. Pat. No. 3,877,372 discloses a fountain solution that includes ethylene glycol, monobutyl ether and at least one of hexylene glycol and ethylene glycol, a silicone glycol copolymer and a defoamer type surfactant. It is stated that isopropyl alcohol may be completely eliminated from this fountain solution.

The above attempts to replace the isopropyl alcohol with other materials have met with limited success either because the other materials are used in similar large quantities, i.e., from between 5 to 30 percent by volume or the amount of isopropyl alcohol has been reduced rather than being completely replaced; for example, a reduction in the isopropyl alcohol from 20 percent by volume to 10 percent by volume.

Isopropyl alcohol is a more volatile compound than water. Although isopropyl alcohol and water vapor pressures are not far different at ordinary temperatures, for instance the respective vapor pressures are about 30 and 18 mm of Hg at 20° C., the heats of vaporization of water and isopropyl are considerably different. Isopropyl alcohol has a heat of vaporization of 164 calories/gm at its boiling point of 82° C. while water has a heat of vaporization of 540 calories/gm at 100° C. Thus in aqueous solutions, isopropyl alcohol migrates to and evaporates from surfaces much faster than water. Consequently, the isopropyl alcohol molecules in the air just above and at the liquid surface of its aqueous solutions must be at a higher concentration than in the bulk liquids. It is believed during the lithographic printing process employing isopropyl alcohol there is a concentrated water-containing isopropyl alcohol layer at all aqueous solution-air interfaces and at all ink-fountain solution admixture interfaces with air. Since isopropanol is miscible with lithographic inks, I also expect isopropanol-rich layers to be present at the air interface of the ink, when ink is admixed with isopropyl alcohol. In the presence of fountain solution containing isopropyl alcohol, I expect an isopropanol-rich layer of water is present at the ink-air interfaces.

If, as predicted here, an isopropanol-rich aqueous layer forms at all of the ink- and fountain-air interfaces, it is aqueous isopropanol that first comes into contact as the inked roller surfaces approach each other at the various nips—not ink and water surfaces. Wetting and intimate contact is thereby virtually assured even though the ink contains water. Since these isopropanol-rich aqueous layers readily wet either ink or water they can easily be squeezed back into their respective films or across to the opposite ink or water films at the nips. They do not need to be displaced. This allows intimate ink-to-ink contact where transfer of ink is required. And, it does not interfere with the required absence of ink transfer at ink-to-water nip areas of the printing plate.

Although not completely understood, I believe that the tendency for isopropanol to be at the air surface of all ink or water film portions of the plate and of the various rollers on the press account for its nearly universal practical acceptance as a fountain solution additive.

There is a need for a substitutive additive for isopropyl alcohol in a fountain solution that adds substantially the same advantageous features to the fountain solution such as the enhanced ink-water control without the disadvantageous features such as adverse toxic and safety properties and relatively high cost of the large volume of isopropyl alcohol that must be added to the fountain solution to be effective.

SUMMARY OF THE INVENTION

This invention relates to an additive for an isopropyl alcohol-free fountain solution that includes a fountain etch concentrate and water. The additive is a non-ionic organic compound that is soluble in water and is miscible with lithographic inks. The additive is substantially non-volatile and has a vapor pressure of 1 mm or less. The fountain solution contains between about 0.5 and 5 percent by volume of the additive and has a surface tension value of less than about 50 dynes/cm.

Suitable substitutive additives having the above properties are n-hexoxyethylene glycol (n-hexyl Cellosolve), n-hexoxydiethylene glycol (n-hexyl carbitol), 2-ethyl-1,3-hexanediol, n-butoxyethylene glycolacetate, n-butoxydiethyleneglycolacetate, 3-butoxy-2-propanol and mixtures thereof.

The use of one or more of the above additives as a replacement for the isopropyl alcohol eliminates the toxic and flammable properties of conventional isopropyl alcohol-containing fountain solutions and provides a fountain solution that has the other desirable properties to provide a high quality printed product on a lithographic press.

Accordingly, the principal object of this invention is to provide an additive for an isopropyl alcohol-free fountain solution.

Another object of this invention is to eliminate the volatile and toxic properties of conventional fountain solutions.

These and other objects of the present invention will be more completely disclosed and described by the following specification and the appended claims.

DESCRIPTION OF THE PREFERRED EMBODIMENTS

In the preparation of fountain solutions, a fountain etch concentrate, such as the fountain etch concentrate sold by Varn Products Co., of Flushing, New York, under the trademark Wonderlene or a fountain etch concentrate sold by Anchor Chemical Co., under the trademark Tame Fountain Etch is admixed with water and isopropyl alcohol is added to the admixture to provide enhanced ink and water control. As previously discussed, the use of isopropyl alcohol causes human health, fire and safety hazards in that it is toxic and flammable. Further, isopropyl alcohol is a costly material and must be added in amounts of between 10 and 30 percent by volume of the fountain solution. The mechanics of the manner in which the isopropyl alcohol provides the enhanced ink and water control is not completely known. It is believed that the properties of the isopropyl alcohol, as for example, its water solubility, ink compatibility, surface tension and vapor pressure are properties which contribute substantially to the mutual compatibility of ink and the aqueous fountain solution.

The additives which serve as a replacement for the isopropyl alcohol in the fountain solutions are organic compounds and have the following general properties.

The additive is soluble in water and is carried in the aqueous dampening solution. The compound must have a water solubility from about 1 percent by weight to completely miscible with water. Compounds with limited solubility as later discussed may advantageously be used if other desirable properties are present.

The water soluble compound is also a non-ionic compound and in a typical lithographic dampening solution exists predominately in molecular form rather than in electrically charged ionic form. Compounds such as amines, sulfonates, phosphates, carboxylic acids and the like that react with water to form ions are not useful as substitutive compounds. Non-ionic compounds which are useful are organic compounds classed as alcohols, diols, triols, esters, glycol ethers and the like. The above, however, must also meet the additional criteria hereinafter discussed.

The herein described additives are also soluble in or at least miscible with lithographic inks. In the Dahlgren dampening system, the dampening solution must travel by means of an inked form roller from the dampening solution pickup rollers to the printing plate. For a sufficient quantity of dampening solution to be conveyed, the additive must be capable of mixing with the ink and thereby make the ink more compatible with water. The specific solubility or miscibility with inks cannot be defined with exact specificity because the composition of the inks varies substantially. Although inks contain polar resins such as polyesters, polyamides, phenolics and the like, the inks are not generally considered to be highly polar in nature. In fact, hydrocarbon oils that are considered to be non-polar can often be used as ink diluents. The substitutive additive to be most effective, therefore, should have a molecular structure in which a significant part is non-polar to thereby facilitate compatibility with most offset inks.

In continuous dampening systems, the dampening solution has a surface tension of from about 40 to 50 dynes/cm or less as measured by the duNouy tensiometer device. Isopropyl alcohol has an undiluted surface tension of about 21 dynes/cm and isopropyl alcohol at about 10 to 30 percent by volume in water has a surface tension of between 40 to 50 dynes/cm. It has been found that between 10 to 30 percent isopropyl alcohol in the dampening solution provides the advantageous ink-water balance control previously discussed. The point where the optimum ink-water balance control is obtained depends on a combination of complicated factors not yet precisely known. These factors include the design and speed of the press, design of the dampening system, the nature and amount of concentrates that are used in the dampening solution, the nature of the form being printed and the experience of the operator. A typical lower limit of effective use of isopropyl alcohol in continuous flow dampening systems is between about 10 to 15 percent by volume. This corresponds to surface tension values in the range of about 40 to 50 dyne/cm.

Low surface tension values could in principle be achieved by adding highly surface active materials such as detergents or surfactants. However, the water solubility of many of these compounds is extremely low and diffusion to a constantly renewing interface or surface as necessary in lithography is quite low. Surfactant molecules also have prominent hydrophobic and hydrophilic portions which impart their characteristic surface activity. To be active, the hydrophobes must become oriented away from the highly polar water matrix into the ink-water interface or into the air. This orientation process may be slow due to conformational energy barriers, and accumulation of enough molecules to form a surface-active monolayer may be slowed even more. In a lithographic press operating at a typical speed, and using a six inch diameter form roller, the water layer from a dampening system pickup roller will be in contact with the form roller ink film for only about 20 to 50 milliseconds, depending upon the width of the nip formed by the two rollers. This is not sufficient time for surfactant molecules to align themselves at the ink-water interface. The additives herein disclosed do not require the use of surfactants to achieve the transport of water from the fountain solution across the interface with the ink and into the ink phase.

It is believed that rather low molecular weight highly mobile molecules are required which in the bulk phase have a surface tension value of less than about 50 dyne/cm or less without necessity for a preferred structure and which have sufficient water solubility to be conveyed by the dampening solution to the freshly formed surfaces created during the practice of lithography. There are two alternatives. In one the compound is sufficiently soluble in water to lower the surface tension by its bulk action in which instance the dampening solution for all practical purposes is a single continuous phase such as dampening solutions containing isopropyl alcohol. The other alternative is that the compound has limited solubility; for example, less than about 10 percent by weight in water and is utilized at or near this solubility limit. I believe that operating in this manner causes the additive to form a new phase rich in the additive. Since water is partially soluble in the additive, this new phase will also contain fountain solution. This situation is analogous to use of isopropyl alcohol as an additive and constitutes in my belief the basis for the success of the additives named herein as advantageous isopropyl alcohol replacements.

This advantageous effect is believed due in part at least to the solubility in both ink and water of the materials herein disclosed. This allows the aqueous dampening liquid to diffuse readily and rapidly onto and into ink or water phases of the printing system. Polymeric compounds should be avoided as additives even though they might impart low surface tension and be soluble both in water and ink. It is believed that it is unlikely for the polymeric compounds to transfer across the water-ink interface sufficiently rapidly as above discussed because the large polymeric molecules diffuse slowly.

Another important property of the additive is its vapor pressure. The vapor pressure of a compound is a general indication of how much of the compound is likely to be in the air just above a fountain solution containing that compound. Isopropyl alcohol has a high vapor pressure. This assures that a high proportion of available isopropyl alcohol molecules will be at fountain solution and ink surfaces.

However, low vapor pressure of the replacement additives herein disclosed is an important criterion. Health and fire hazards increase with an increase in vapor pressure. The preferred vapor pressure for the substitutive additives disclosed herein is about 1 mm of mercury (Hg) at 20° C. or less. The vapor pressure of isopropyl alcohol at 20° C. under similar conditions is about 30 mm of Hg. A low vapor pressure assures that health and safety hazards associated with the additives are minimized. Therefore, compounds which would have the desirable properties previously discussed would be unsuitable as a substitutive additive because of their high vapor pressures.

The specific molecular weight of the additive should be between about 100 and 300 gm/mole. A very low molecular weight compound will usually be volatile and therefore will not meet the criterion for low vapor pressure.

It is believed that a viable replacement for isopropyl alcohol must supply the same kind of water transport conditions previously described under actual operating conditions as fountain solutions containing isopropyl alcohol. This could possibly be accomplished using a similar volatile, low heat of vaporization compound such as n-propanol, ethanol and methanol. These compounds, however, although they may operate reasonably well, do not satisfy the safety and toxic tests and therefore are not used in the practice of lithography. Further, the cost of these materials in the volume required is substantially the same as that of the isopropyl alcohol.

In accordance with my invention, I have discovered that certain limited solubility materials satisfy the physical property criteria previously discussed. Thus, using one or more of the preferred compounds herein described at or near the aqueous solubility limit of one or more of the compounds apparently provides a high concentration of that compound together with aqueous solution dissolved therein at the interfaces of ink or water with air and is analogous in respect to the fountain solutions containing isopropyl alcohol.

It is preferred not to use amounts of the additive significantly higher than the compound's solubility in water. Such a condition is accompanied by considerable phase separation which allows the ink-compatible additive to attack the ink thereby negating in part the ability of the lithographic system to maintain sharp and disctinct separation of the ink on the image and fountain solution or non-image portions of the printing plate and therefore on the printed copy. The preferred concentration of my additive is close to but generally below the solubility limit of the compound being used and is based on printing trials designed to determine the optimum condition. This observation is substantiated by a relatively poor LBT performance when a solubility additive is employed in amounts substantially greater than its solubility limit.

Whenever a liquid has limited solubility in water, water also has a limited solubility in the material. This supplies a further important criterion for selecting an efficient substitutive additive water transport agent for isopropyl alcohol. The higher the solubility of water in the selected compound, the more likely it can transport sufficient quantities of water to inked surfaces and thereby efficiently renew the water at the plate surfaces. Conversely, the solubility of water in the compound can be so low despite acceptable solubility of the compound in water that an inefficient amount of transport takes place.

The following Examples of the solubility of selected materials in water and water solubility in the materials and the solubility of the material in heptane is set forth in the following table expressed in percent by weight at 20° C.

SOLUBILITIES OF ADDITIVES

| | Sol. in Water | Sol. of Water in | Sol. in Heptane |
|---|---|---|---|
| n-hexyl Carbitol | 1.7 | 56 | Complete |
| n-hexyl Cellosolve | 1.0 | 19 | Complete |
| 2-ethyl-1,3-hexanediol | 4.2 | 12 | NA |
| phenyl glycol ethers | 3.0 | 15 | NA |

The following Examples are illustrative of preferred substitutive additives for isopropyl alcohol in fountain solutions.

EXAMPLE 1

23.7 ml of Wonderlene fountain etch concentrate sold by Varn Products, Co., Flushing, New York, and 38.2 ml of n-hexyl Carbitol sold by Union Carbide Co., Tarrytown, New York, was mixed with 3,800 ml of distilled water to make a 1 percent by volume fountain solution containing the n-hexyl Carbitol. This fountain solution was used on a Miehle-Goss-Dexter lithographic press with a Dahlgren recirculating dampening system. The press produced high quality printed product and press runnability features were judged good to excellent. The only required press change was to increase the Dahlgren dampening system roller drive rheostat setting from 40 to 70.

A similar run was prepared using 5 percent isopropyl alcohol in place of the 1 percent n-hexyl Carbitol and a small amount of spurious printing in non-image areas (toning) was exhibited until the Dahlgren drive rheostat was increased from 40 to 80. Some plugging of halftones was apparent but overall printing quality was judged acceptable at the higher rheostat settings. A similar press trial using distilled water in place of a fountain solution formula resulted in a loss of dampening control and extensive printing in the non-image areas.

EXAMPLE 2

A fountain solution similar to that previously described in Example 1 was prepared wherein 1 percent n-hexyl Cellosolve was substituted for the n-hexyl Carbitol in the solution. Good printing characteristics were obtained at rheostat settings of 70 to 85 and a slightly reduced skew of the Dahlgren metering roller.

EXAMPLE 3

Solution A was prepared using 7 ml of 85 percent phosphoric acid in a total of 4.5 liters of tap water. A fountain solution was prepared using 58 ml of solution A, 14 ml of 14° Be (Baume) gum arabic sold by Anchor Chemical Co., Hicksville, New York, and 76 ml of 2-ethyl-1,3-hexanediol sold by Union Carbide Co., Tarrytown, N.Y., and 3,637 ml of tap water to make 3,785 ml of 2 percent hexanediol solution. This fountain solution was used on the same press as in Example 1 with excellent printing quality and runnability.

EXAMPLE 4

A run similar to Example 3 was prepared using a solution in which 27 ml of n-hexyl Carbitol was substituted for the 2-ethyl-1,3-hexanediol. The solution contained 0.7 percent n-hexyl Carbitol. Printing results were the equivalent of a fountain solution contaning 20 percent isopropanol.

EXAMPLE 5

Solution B was prepared by diluting 56 ml of 85 percent phosphoric acid with tap water to obtain a total volume of 3,785 ml (1 gallon). Solution C was prepared from 7,570 ml of tap water, 20 ml of solution B and 30 ml of 14° Be gum arabic. To 7,620 ml of solution C was added 160 ml of phenyl glycol ethers purchased from Union Carbide Co., to make up 7,780 ml of fountain solution containing 2 percent by volume of the phenyl glycol ethers. The phenyl glycol ethers are described by Union Carbide Co., in their literature as containing 70 percent phenyl Cellosolve and 30 percent Carbitol. Printing runs as in Example 1 were considered good with the rheostat setting at 88.

EXAMPLE 6

A fountain solution was prepared to contain 0.5 percent by volume n-hexyl Carbitol and 1.5 percent by volume of Tame Fountain Etch sold by Anchor Chemical Co. The fountain solution was tested on the same press as Example 1 with good printing results at a rheostat feed rate setting of 54.

It will be apparent from the foregoing Examples that with my invention, it is now possible to prepare an isopropyl alcohol-free fountain solution that has the desirable properties of a fountain solution containing isopropyl alcohol and does not have the undesirable health and safety properties of an isopropyl alcohol fountain solution.

The Examples illustrate that only between 0.5 percent and 2 percent by volume of the additive is necessary to provide the enhanced water-ink compatibility as compared with between 10 and 30 percent by volume isopropyl alcohol. All of the additives enumerated herein are commercially available materials and all of the materials are suitable at less than 5 percent by volume of the additive in the fountain solution. This permits using an additive priced from about 4 to 6 times as high as isopropyl alcohol without serious economic penalties. Where the additive is utilized at a very low concentration as for instance 1 percent by volume a very significant cost savings results in the use of this fountain solution.

The additives herein described provide an advantageous means for achieving uniform steady transfer of fountain solution from the dampening system fountain reservoir to the printing plate in lithographic printing systems. Further, the additives provide the uniform steady transfer of fountain solution without having to substantially alter the lithographic process or the existing process machinery. The additives eliminate the human health, fire and safety hazards associated with the use of isopropyl alcohol in the dampening solution of lithographic printing systems. The additives further provide the enhanced ink and water control normally associated in practice only with the use of isopropyl alcohol. The additives further reduce the cost of using continuous dampening lithographic processes.

According to the provisions of the patent statutes, I have explained the principle, preferred construction and mode of operation of my invention and have illustrated and described what I now consider to represent its best embodiments. However , it should be understood that, within the scope of the appended claims, the invention may be practiced otherwise than as specifically illustrated and described.

I claim:

1. An isopropyl alcohol-free fountain solution consisting essentially of, between about 0.5 and 5 percent by volume of one or more compounds selected from a group of non-ionic compounds having less than about 20 percent solubility in water at from about 15°-35° C., the solubility of water in said compounds being not less than about equal to said compounds solubility in water, said non-ionic compounds being miscible with printing inks and having a surface tension value less than about 40 to 50 dynes/cm and having a vapor pressure value less than about 5 mm Hg at 15° to 35° C., said non-ionic organic compounds being present within about 5 weight percent of said non-ionic organic compound water solubility limit at the dampening solution temperature, said non-ionic compounds having a molecular weight of between 100 and 300 gm/mole, said non-ionic organic compounds having a solubility in water to transport sufficient quantities of water to inked surfaces and efficiently renew the water at the surfaces of an inked plate, and between one-tenth of 1 percent to about 5 percent by weight of a lithographic fountain solution etch concentrate.

2. An isopropyl alcohol-free fountain solution consisting essentially of, between about 0.5 and 5 percent by volume of one or more compounds selected from a group of non-ionic compounds consisting essentially of n-hexoxyethylene glycol (n-hexyl Cellosolve), n-hexoxydiethylene glycol (n-hexyl carbitol), 2-ethyl-1,3-hexanediol, n-butoxyethylene glycolacetate, n-butoxydiethyleneglycolacetate, 3-butoxy-2-propanol and mixtures thereof, said non-ionic compounds being miscible with printing inks and having a surface tension value less than about 40 to 50 dynes/cm and having a vapor pressure value less than about 5 mm Hg at 15° to 35° C., said non-ionic organic compounds being present within about 5 weight percent of said non-ionic organic compound water solubility limit at the dampening solution temperature, said non-ionic compounds having a molecular weight of between 100 and 300 gm/mole, said non-ionic organic compounds having a solubility in water to transport sufficient quantities of water to inked surfaces and efficiently renew the water at the surfaces of an inked plate, and between one-tenth of 1 percent to about 5 percent by weight of a lithographic fountain solution etch concentrate.

* * * * *